3,305,417
PROCESS FOR PREPARING PREIMPREGNATED STRANDS OF FIBERS AND USE OF RESULTING PRODUCTS IN MAKING REINFORCED COMPOSITES
Samuel H. Christie, Warren Township, N.J., assignor to Shell Oil Company, New York, N.Y., a corporation of Delaware
No Drawing. Filed Dec. 3, 1963, Ser. No. 327,828
19 Claims. (Cl. 156—90)

This invention relates to a new process for preparing preimpregnated strands of fibers or rovings and to the use of the resulting products in making reinforced composites. More particularly, the invention relates to a process for preparing strands of fibers or rovings impregnated with resinous material, and to the use of the resulting products in the filament winding industry and in laminating and molding applications.

Specifically, the invention provides a new process for preparing strands of fibers and preferably glass yarns or roving, impregnated with a thermosetting resinous material, and preferably a polyepoxide resin, said preimpregnated strands having unlimited shelf life at ambient temperature but which, when exposed to elevated temperatures and pressures, cure to form products of superior physical properties. This new process comprises applying to the said strands three separate coatings, one coating comprising the thermosetting resin, another coating comprising the curing agent for the thermosetting resin, and another coating being an inert barrier material, this latter coating being between and separating the thermosetting resin and curing agent coatings.

As a special embodiment, the invention provides a process for preparing preimpregnated glass rovings ideally suited for use in filament winding which comprises passing the glass roving through a liquid bath containing the thermosetting resin, and preferably a specially prepared polyepoxide precondensate, drying the resulting product, passing the product then through a liquid bath containing a barrier material, such as, for example, polyvinyl alcohol, drying the resulting product, and then passing the treated roving into a liquid bath containing a curing agent for the thermosetting material which is preferably a specially prepared adduct, and then drying for a short period to yield the desired preimpregnated glass roving.

The invention further provides a process for using the above-described new preimpregnated strands for making reinforced composites, such as filament wound products, laminated products, molded products, and the like. This process comprises using the preimpregnated strands or rovings in the conventional technique for preparing the reinforced composite, such as in the case of filament winding to wind the strand on a mandrel, and then exposing the resulting product to the desired heat to melt the barrier coating and effect a union of the resin and curing agent and ultimate cure of the thermosetting material.

Many products are now being made by a technique known as filament winding. Products prepared in this manner are generally of very light weight but have excellent strength, good chemical resistance and excellent resistance to deformation and loss of strength at elevated temperatures. This technique is thus ideally suited for use in making rocket casings, tanks, submarine hulls and the like.

The general procedure for filament winding involves dipping a glass roving or yarn into a liquid mixture containing a resin and curing agent, winding the treated fibers onto a mandrel of the desired shape and then subjecting the resulting product to heat to effect a cure of the resinous binder. In some cases, it is difficult to utilize the roving directly after dipping so attempts have been made to prepare a preimpregnated roving which can be stored for some time before use. The problem here, however, has been to prepare such a product which is stable at room temperature during storage but can be subsequently cured at a reasonable elevated temperature. Prior attempts at making such room stable products have not been satisfactory as the preimpregnated fibers have required too drastic curing temperatures or have failed to give cured products having the desired physical properties, such as elevated temperature strength and the like.

It is an object of the invention, therefore, to provide a new process for preparing preimpregnated strands. It is a further object to provide a process for preparing preimpregnated strands which have unlimited shelf life at ambient temperatures. It is a further object to provide new preimpregnated glass rovings which may be cured at reasonable temperatures and pressures to form the desired product. It is a further object to provide new preimpregnated yarns and rovings which can be cured to form products having excellent strength, good chemical resistance and excellent resistance to deformation and loss of strength at elevated temperatures. It is a further object to provide new preimpregnated glass rovings which can be used with great success in the filament winding and lamination industries. It is a further object to provide an improved process for preparing reinforced composites using the new preimpregnated rovings. Other objects and advantages of the invention will be apparent from the following detailed description thereof.

It has now been discovered that these and other objects may be accomplished by the process of the invention which comprises treating the strands so as to form three separate coatings thereon, one coating comprising a thermosetting resin, and preferably a polyepoxide precondensate, another coating comprising the curing agent for the thermosetting resin, and preferably an amine adduct, and a third coating being an inert barrier material, said third coating being between and separating the first and second coating. It has been found that preimpregnated fibers prepared in this manner can be stored at ambient temperatures for indefinite periods without danger of premature curing. It has also been found that when such preimpregnated fibers are exposed to reasonable elevated temperatures e.g., temperatures of about 150° C. which effect a melting of the barrier material and union of the thermosetting resin and curing agent, they can be quickly cured to form reinforced composite products having excellent strength, good chemical resistance and excellent resistance to deformation and loss of strength at high temperatures, e.g. 300° F. The new products are thus ideally suited for the preparation of woven cloth which may be subsequently cured or used in the preparation of laminated articles, and in the preparation of filament wound articles as described hereinafter.

The new products are thus also ideally suited for use in preparing fiber reinforced molded articles; in which the coated strands are chopped into ¼ inch to 2 inch long segments and subsequently placed into a mold. Heat (e.g., 100–200° C.) and pressure (e.g., 50–1000 p.s.i.) then convert the strands into an infusible, insoluble, molded article.

The resinous materials used in the formation of one of the coatings on the strands of fiber include those materials which can be subsequently cross-linked to form an insoluble infusible coating. Examples of these include, among others, unsaturated polyesters, polyurethanes, polycarbonates, polyepoxides, and the like. Preferred materials for use in the process include the polyepoxide, e.g., materials which possess more than one vic-epoxy group, i.e., more than one

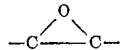

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monogylcerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3 - epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4 - butanetricarboxylate, di(5,6 - epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as 2,3-epoxybutyl 3,4-epoxypentanoate, 3,4 - epoxyhexyl 3,4-epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxlic acids such as, for example, dimethyl 8,9,12,13 - diepoxyiconsanedioate, dibutyl 7,8,11,12-diepoxyoctadecanedioate, dioctyl 10,11-diethyl-8,9,12,13 - diepoxyeicosanedioate, dihexyl 6,7,10,11 - diepoxyhexadecanedioate, didecyl 9 - epoxyethyl - 10,11-epoxyoctadecanedioate, dibutyl 3-butyl-3,4,5,6-diepoxycyclohexane-1,2 - dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in above noted U.S. 2,633,458 are good examples of polyepoxides of this type. Other examples include the polyglycidyl ether of 1,1,2,2-tetrakis(4-hydroxyphenyl) ethane (epoxy value of 0.45 eq./100 g. and melting point 85° C.) polyglycidyl ether of 1,1,5,5-tetrakis(hydroxyphenyl)pentane (epoxy value 0.514 eq./100 g.) and the like and mixtures thereof.

The particularly preferred thermosetting resins to be employed include the epoxy-containing condensates of polyepoxides and other reactive materials, such as polycarboxylic acids, polycarboxylic acid anhydrides, polyamines, polymercaptans and the like. In the preparation of these condensates any one or more of the reactive components are combined with at least 1.5 times the equivalent amount of the polyepoxide, preferably in the presence of catalytic materials. The amount of the reactants are, of course, quite critical. Unless the proper proportions are utilized, the resulting product will be an insoluble infusible product and cannot be utilized in the process of the invention. As used herein, and in the appended claims, the expression "chemical equivalent" amount used in relation to the reactive component and polyepoxide refers to the amount needed to furnish one epoxy group for every reactive group (e.g., carboxyl group, amine hydrogen, etc.). Preferably the reactive component and the polyepoxide are combined in chemical equivalent ratios of 1:2 to 1:4. If the reactive component is trifunctional, a large excess of the polyepoxide is preferred.

The method of combining is also important. It is usually desirable to add the reactive component to the large excess of the polyepoxide to prevent local conversion of the polyepoxide to the insoluble form.

Catalysts that may be used to accelerate the precondensation include, among others, tertiary amines, quaternary ammonium salts and various organo-substituted phosphines, such as triphenyl phosphine, tributyl phosphine and the like. These catalytic materials are preferably utilized in amounts varying from about .05% to 5% by weight of the reactants.

The precondensation may be conducted in the presence or absence of solvents or diluents. If the reactants are fluid materials, the reaction may generally be accomplished without solvents or diluents. However, in some cases, where either one or both reactants are solids or viscous liquids it may be desirable to add diluents to assist in effecting the reaction, such as, for example, inert-hydrocarbons as toluene, xylene, cyclohexane, and other materials, such as ethylene glycol monoethyl ether, cyclohexanone and the like.

Temperatures employed in the reaction will generally vary from about 50° C. to about 150° C. In most cases, the active component and polyepoxide will be quite reactive and temperatures of the order of about 50° C. to 125° C. will be sufficient to effect the desired reaction.

The finished precondensate will vary from viscous liquids to solid resins. They will contain active epoxy groups and can be cured by the reaction with curing agents as described hereinafter. The precondensates are soluble in solvents, such as acetone, toluene, benzene, xylene and the like. The products will be of much higher molecular weight than the basic polyepoxides from which they are formed, and in most cases will contain at least 2 of the polyepoxides units and preferably 3 to 10 units.

Preparation of some of the precondensates according to the above procedure is shown below:

*Precondensate of polyether A and diaminodiphenylsulfone*

372 parts of diglycidyl ether of 2,2-bis(4-hydroxyphenyl)propane, 93 parts of ethylene glycol monomethyl ether was combined with 62 parts of diaminodiphenylsulfone. The mixture was heated for 3 hours at 110° C., cooled, and reduced to 50% by weight of non-volatiles with acetone.

*Precondensate of polyether A and phthalic anhydride*

57 parts of phthalic anhydride was dissolved in 300 parts of polyether A by heating to 80° C. in a reaction flask equipped with stirrer, condenser and thermometer. The temperature was increased to 100° C. and 3.6 parts of methyl diethanolamine was added causing the temperature to go to 154° C. Stirring was continued for four hours and the temperature slowly dropped to 100° C. The resulting product was a solid resin having an epoxy value of 0.313 eq./100 g., and OH value of 0.09 and acidity of 0.007. This product was easily dissolved in solvent comprising ½ methyl isobutyl ketone and ½ xylene.

*Precondensate of glycidyl ether of 1,1,2,2-tetrakis(4-hydroxyphenyl)ethane and diaminodiphenylsulfone*

364 parts of the tetraglycidyl ether of 1,1,2,2-tetrakis (4-hydroxyphenyl)ethane was combined with 93 parts of toluene, 93 parts of ethylene glycol monomethyl ether and 62 parts of diaminodiphenylsulfone. The mixture was stirred and heated to 110° C. and held at this temperature for 3 hours. The mixture was then cooled and reduced to 50% w. non-volatiles by the additon of acetone.

Other examples of precondensates may be found in Newey—U.S. 2,970,983 and Carey—U.S. 3,067,170.

The curing agents used in the application of another coating on the strands of fibers include those materials which convert the afore-described thermosetting resinous materials into an insoluble, infusible product. The nature of the curing agent will depend on the nature of the thermosetting resin. For example, if the resin is an unsaturated polyester, the curing agent may be one capable of yielding free radicals, such as organic peroxides. If the material is a polyurethane, the curing agent may be a hydrogen-containing material, such as polyols, polyamines and the like.

If the thermosetting material is the preferred polyepoxides noted above, the curing agent may be any of the known materials which cross-link polyepoxides, such as polycarboxylic acids and anhydrides, polyamines, polymercaptans, boron-trifluoride complexes, hydrazides, polyamides, phenol-formaldehyde resins, urea- and melamine-formaldehyde resins and the like. Particularly preferred are the curing agents containing a plurality of amino hydrogen atoms, such as, for example, dicyandiamide, melamine, urea, metal-phenylenediamine, diaminodiphenylsulfone, and the like. Also preferred as curing agents are imidazoles such as 2-methylimidazole, imidazole, and the like.

Also preferred as curing agents are the soluble adducts of amines and polyepoxides and their salts, such as described in U.S. 2,651,589 and U.S. 2,640,037. Still other examples include the acetone soluble reaction products of polyamines and monoepoxides, the acetone soluble reaction products of polyamines with unsaturated nitriles, such as acrylonitrile, imidazoline compounds such as obtained by reacting monocarboxylic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction products of polyamines with acrylates, and amino hydrogen-containing polyamides as may be obtained by reacting a polycarboxylic acid with a polyamine by conventional methods such as described in U.S. 2,450,940 and U.S. 2,695,908.

Particularly preferred curing agents to be employed include the adducts obtained by reacting the above-described polyepoxides with at least 1.5 times the equivalent amount of an epoxy curing agent. Epoxy curing agents used in such a reaction are preferably those containing a plurality of neutralizable hydrogen atoms which have a dissociation constant in 0.01 N aqueous solution at 20° C. between $10^{-3}$ and $10^{-12}$. Examples of such include, among others, phosphoric acid, succinic acid, adipic acid, phthalic acid, ethylene diamine, propylene diamine, diethylene triamine, 2,4-diamino-2-methylpentane, 3,4-diamino-3,4-dimethylhexane and the like.

As with the epoxy-containing precondensates, it is important also in making the curing agent adducts to use proper amounts of curing agent and polyepoxides in order to obtain the desired soluble adduct curing agent. One must use at least 1.1 times the equivalent amount of the polyepoxide. As use herein, and in the appended claims, the expression "chemical equivalent" amount as used in relation to the curing agent and polyepoxide refers to the amount of curing agent needed to furnish one neutralizable hydrogen per epoxy group. Preferably the curing agent and polyepoxide are combined in equivalent ratios of 1.5:1 to 4:1.

The method of combining is also important. It is usually desirable to add the polyepoxy to the large excess of the reactive component to prevent local conversion of the polyepoxide to the insoluble form.

The reaction may be conducted in the presence or absence of solvents or diluents. In case diluents are desired, they may be the inert hydrocarbons, such as toluene, xylene, cyclohexane, and other materials, such as ethylene glycol monoethyl ether, cyclohexanone and the like.

Temperatures employed in the reaction will generally vary from about 50° C. to about 150° C. In most cases, the active component and polyepoxide will be quite reactive and temperatures of the order of about 50° C. to 125° C. will be sufficient to effect the desired reaction.

The finished curing agent adduct will vary from viscous liquids to solids. They will contain active hydrogen atoms and will act to cure polyepoxides when combined therewith. The adducts are soluble in solvents, such as acetone, toluene, benzene, xylene and the like. The products will be of much higher molecular weight than the basic curing agent from which they are formed, and in most cases will contain at least 2 of the curing agent molecules and preferably from 3 to 10.

The preparation of some of the curing agent adducts according to the above procedure is shown below:

*Polyether A and m-phenylenediamine adduct*

205 parts of m-phenylenediamine, 50 parts ethylene glycol monomethyl ether and 187 parts of toluene were mixed together and heated to 65° C. 357 parts of polyether A were then added. The temperature was then raised to 100° C. and held there for about 2 hours. The curing agent solution was cooled and reduced to 50% non-volatiles with acetone.

*Polyether A and diethylenetriamine adduct*

0.43 mole of diethylenetriamine was dissolved in 50 parts of dioxane. The solution was heated to 60° C. and 100 parts of polyether A dissolved in 100 parts of dioxane were added thereto. The reaction mixture was heated to about 104° C. for 20 hours and the resulting solution run into water to precipitate the same. The resulting product was a polyamine adduct which could be easily dissolved in acetone to form an active curing agent solution.

Other examples of adduct curing agents may be found in Shokal et al., U.S. 2,651,589 and Shokal et al., U.S. 2,643,239.

The material used to form the barrier coating between the thermosetting resin and the curing agent may be any inert material which is capable of forming a solid coating, is insoluble in liquids used to apply the subsequent coatings, melts at the temperature required for curing. By "inert" is meant a material which does not react with the thermosetting material or the curing agent at the temperature of storage, i.e., 0° C. to 50° C. The material should be capable of forming a solid coating at the storage temperature but capable of melting or diffusing at the curing temperature, e.g., at temperatures above 100° C. Examples of these materials include, among others, gelatin, starch, agar, methyl cellulose, starch degradation products, such as dextrine, vinyl polymers, such as polyvinyl alcohols, polyvinyl acetals as obtained by reacting the polyvinyl alcohols with aldehydes, and the like, and mixtures thereof. Hardening agents may be employed with the above materials to give a harder barrier coating as long as such hardening agents are not reactive with the thermosetting resin previously applied to the roving.

The coatings of the above-noted three different types of material may be applied to the strands of fibers in any suitable manner. The preferred method comprises forming solutions of the desired materials and then dipping or otherwise applying the solution to the strands in the desired order. In most cases, it is preferred to place the impregnating solution in conventional impregnation equipment and run the strands or roving into and through the impregnation bath containing the impregnating solution. It is also possible, of course, to apply the materials as by painting, spraying or other suitable methods.

The order in which the coatings are applied may be varied as long as the inert barrier coating separates the coating of thermosetting polymer and curing agent. Thus, the thermosetting polymer may be applied first, then the barrier coating and finally the curing agent coating, or the procedure may be reversed and the curing agent coating applied first, then the barrier coating and finally the thermosetting polymer coating. Of course, additional coatings may be applied as long as the correct barrier coating is used to separate the active ingredients.

The amount of each coating may vary depending on the reactants and intended applications. In general, the amount of thermosetting polymer applied varies from 15 to 30%. The amount of curing agent may vary from about 1 to 10% if curing takes place by catalytic action, but from about 5–100% if curing takes place by a direct reaction of the resin and curing agent. These concentrations of curing agent, of course, are based on the weight of the thermosetting polymer.

After each coating has been applied, it is preferred to dry the treated strand or roving before application of the next coating. This may be accomplished by passing the impregnated strand through drying oven or other means to expose the strands to the necessary heat. Preferred drying temperatures vary from about 70° C. to about 150° C. The drying can be accomplished in a short period, say from 1 to 10 seconds, so the exposure period will be very small and will not effect significant melting of the barrier coating.

The finished coated strand or roving may then be rolled on a spool and stored for eventual use in the formation of reinforced composites. The finished coated strands will be stable at temperatures up to about 50° C. and can be stored indefinitely at temperatures below that point.

As noted, the new preimpregnated strands or roving can be utilized for a great variety of different applications. They may be used, for example, in conventional filament winding operations to form rocket casings, tanks, submarine hulls, tanks for cars and trucks and the like. The preimpregnated strands or rovings may also be woven into cloth. The cloth can then be cut into squares, stacked and made into a laminate using heat and pressure.

The preimpregnated strands of the present invention are particularly suited for use in the preparation of filament wound composites. In this application, the preimpregnated strands or rovings are wound under tension, e.g., 0.1 pound to 2.5 pounds per end, onto the desired mandrel or form and heat applied to melt the barrier coating and effect a union of the thermosetting resin and curing agent and ultimate cure of the resin. Care should be taken to insure that the proportion of resin and curing agent brought together on the mandrel is such to provide optimum properties to the cured composite. Such proportions may be varied, for example, by adjusting the resin and/or curing agent content of the separate strands.

The winding may be accomplished in any desired manner, such as around the circumference of the mandrel or at any desired angle.

Temperatures used in the melting and curing of the resin preferably are above 125° C., and more preferably between 125° C. and 175° C.

The time for cure will vary with the various components and temperature, but will generally vary from a few minutes to 3 or more hours.

The composites formed by the above process will be hard insoluble infusible products with excellent strength, good chemical resistance and excellent resistance to deformation. Depending on the mandrels and method of winding employed, the products can be utilized as pipes, tubes, poles, rocket casings, tanks, submarine hulls, silos and the like.

In making laminates from the preimpregnated strands as by first weaving cloth with strands preimpregnated with the three coatings as noted above, one generally superimposes the sheets of cloth according to the desired number of plies and then applies heat and pressure to melt the barrier coating, cure the resin and form the desired laminated products. Temperatures in this applicatiton will generally range from about 125° C. to 200° C. with pressures generally varying between 30 p.s.i. and 500 p.s.i.

The strands of fibers used in the process of the invention include those of continuous or staple type such as rovings, yarns, strings, threads, and the like. The strands or fibers may be made out of a variety of different materials. They may be natural or synthetic and may be of any desired size. Examples of these materials include, among others, cotton, linen, silk, cellulose esters, jute, hemp, rayon, animal fibers, such as wool, hair, mohair, synthetic fibers including fibers from polyesters, such as for example, the ethylene glycol-terephthalic acid esters (Dacron), the acrylic polymers, such as, for example, acrylonitrile polymers (Orlon), the polyethylenes, polypropylenes, polyurethanes (Perluran), polyvinyl alcohol, proteins, vinyl chloride vinylidene polymers (Vinyon), mineral fibers (Fiberglas), polyamides, such as the aliphatic dicarboxylic acid-polyamides reaction products (nylon), and the like and mixtures thereof. Because of its greater strength, strands prepared from glass are particularly preferred. The process is also applicable, of course, to the treatment of individual fibers or of cloth woven from the fibers or strands as well as nonwoven fabrics prepared from fibrous products. The process is applicable also to fine wires, e.g., from 0.0004 to 0.04 inch in diameter, of various metals, such as copper, aluminum, stainless steel, phosphatized steel, iron, and the like.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise specified parts described in the examples are parts by weight. The polyethers referred to by letter are those in U.S. 2,633,458.

*Example I*

This example illustrates the preparation of the preimpregnated glass fibers with a resin based on polyether A, an inert barrier of polyvinyl alcohol and a curing agent based on diaminodiphenylsulfone.

An epoxy-containing precondensate was prepared by reacting 372 parts of polyether A with 62 parts of diaminodiphenylsulfone for three hours at 110° C., as described above.

An amino-containing adduct useful as the curing agent was prepared by reacting 205 parts of m-phenylenediamine, with 357 parts of polyether A at 100° C. as described above.

Twelve-end S-994 glass roving with HTS finish was passed through a bath containing the epoxy-containing precondensate prepared as above which had been reduced to 30% solids by addition of acetone. The roving was then passed through an 8 ft. long oven heated to 280° F. at 0.4 ft./sec. and wound on a cardboard spool. The resin content on the roving was 19%. This same roving was then passed through an aqueous solution of polyvinyl alcohol of concentration 3%. The coated roving was then passed through an 8 ft. long oven heated at 280° F. at 1.5 ft./sec. thereby forming a barrier coating of 3% by weight of polyvinyl alcohol. The same roving was next passed through a bath containing the amino-containing precondensate as described above reduced to 20% non-volatile with a mixture of 4 parts acetone and 1 part toluene. The solvent was then removed by passing the roving through an 8 ft. long oven heated to 180° F. at 1.5 ft./sec.

These strands were room stable and could be stored for months at 40° C. without gelation.

A filament wound composite (NOL ring) was made from the above roving using 18 pounds of tension, and by preheating the mold to 75° C. After curing for 3 hours at 150° C., a hard, solvent-resistant composite resulted having the following properties:

| | |
|---|---|
| Hoop stress, p.s.i., 23° C. | 270,000 |
| Glass stress, p.s.i., 23° C. | 390,000 |
| Tensile modulus, p.s.i., 23° C. | 6,400,000 |
| Horizontal shear strength, p.s.i.: | |
| 23° C. | 8,400 |
| 150° C. | 1,000 |

*Example II*

Example I was repeated with the exception that the polyvinyl alcohol was replaced with an acrylic latex thinned with water. Related results are obtained.

*Example III*

Example I was repeated with the exception that the polyvinyl alcohol was replaced with paraffin wax in 5% weight in xylene.

*Example IV*

Example I was repeated with the exception that the polyvinyl alcohol was replaced with a styrene-butadiene latex thinned with water.

*Example V*

Example I was repeated with the exception that the polyether A was replaced with polyether B. Related results are obtained.

*Example VI*

Example I was repeated with the exception that the m-phenylene-diamine was replaced with N-aminoethyl-piperazine. A strong hard composite was obtained.

*Example VII*

A piece of fabric was prepared by weaving the preimpregnated strands shown in Example I. Squares were cut from this sheet, superimposed and the composite cured at 125° C. and 500 p.s.i. The resulting product is a hard, tough laminate.

*Example VIII*

Glass roving having the composition shown in Example I was chopped into ½ inch long segments, which were placed into a compression mold preheated to 150° C. The mold was closed for three minutes at a pressure of 200 p.s.i. The mold was then opened and the part ejected. The part was then post cured in an oven at 150° C. for 2 hours, forming an infusible, insoluble molded piece.

*Example IX*

Example I is repeated with the exception that the curing agent is as follows: 2-methylimidazole, melamine, 4,4'-methylenedianiline and benzyimidazole. Related results are obtained.

*Example X*

Example I is repeated with the exception that the precondensate of polyether A is replaced with a precondensate of polyether A and phthalic anhydride prepared as noted above. Related results are obtained.

*Example XI*

Example I is repeated with the exception that the precondensate of polyether A is replaced with a precondensate of polyether A and dimerized linoleic acid. Related results are obtained.

I claim as my invention:

1. A process for preparing preimpregnated fibers useful for making reinforced composites which comprises applying to the fibers three separate coatings of material, one coating comprising a thermosetting resin, another coating comprising a curing agent for the thermosetting resin, and another coating comprising an inert barrier material, the said inert barrier coating being between and separating the layer of thermosetting resin and layer of curing agent.

2. A process as in claim 1 wherein the thermosetting resin is an epoxy resin.

3. A process for preparing preimpregnated strands of fibers useful for making reinforced composites which comprises forming on the strands a coating comprising a polyepoxide resin, forming on top of that coating a second coating comprising a material which is non-reactive with and insoluble in the aforedescribed polyepoxide resin and epoxy resin curing agent described hereinafter and melts at a temperature below about 150° C. and forming on top of that second coating a third coating comprising an epoxy resin curing agent.

4. A process as in claim 3 wherein the strands are glass rovings.

5. A process as in claim 3 wherein the polyepoxide is an epoxy-containing precondensate of a polyglycidyl ether and a polyamine.

6. A process as in claim 3 wherein the epoxy resin curing agent is a polyamino-containing adduct of a polyglycidyl ether and an excess of a polyamine.

7. A process as in claim 3 wherein the epoxy resin curing agent is an imidazole.

8. A process for preparing a preimpregnated glass roving useful for making reinforced composites which comprises passing the roving into a liquid solution containing a polyepoxide, drying, passing the resulting impregnated roving into a second liquid solution containing an inert barrier material, drying, and passing the resulting twice coated roving into a liquid solution containing a polyepoxide curing agent and then drying.

9. A process as in claim 7 wherein the inert barrier material is a polyvinyl alcohol.

10. A process as in claim 7 wherein the inert barrier material is a vinyl polymer which is insoluble in the solvent used in applying the curing agent layer and which melts at the temperature needed for the curing of the polyepoxide.

11. A process as in claim 7 wherein the inert barrier material is gelatin insolubilized with formaldehyde.

12. A process as in claim 7 wherein the polyepoxide is an epoxy-containing precondensate of a glycidyl polyether of 2,2-bis(4-hydroxyphenyl) propane and an aromatic polyamine, and the polyepoxide curing agent is an amino-containing adduct of a glycidyl polyether of 2,2-bis(4-hydroxyphenyl) propane and an aromatic polyamine.

13. Preimpregnated fibers coated with three layers of material, one layer comprising a thermosetting resin, another layer comprising a curing agent for the thermosetting resin, and another layer comprising an inert barrier material, the said inert barrier layer being between and separating the layer of thermosetting resin and layer of curing agent.

14. Preimpregnated glass rovings coated with three layers of material, the first layer adhering to the surface of the glass roving comprising a polyepoxide resin, the second layer adhering to the top of the first layer comprising an inert barrier material, and a third layer adhering to the top of the second layer comprising an epoxy resin curing agent.

15. Preimpregnated glass rovings coated with a layer of a glycidyl polyether, a layer of an inert vinyl polymer which is insoluble in the solvent used in applying the next layer and which melts at the temperature needed for the curing of the glycidyl polyether, and a third layer comprising an aromatic polyamine epoxy curing agent.

16. Preimpregnated glass rovings coated on the surface with a layer of an epoxy-containing precondensate of an excess of a glycidyl polyether of a polyhydric phenol with an aromatic polyamine, a second layer adhering to the first comprising a polyvinyl alcohol, and a third layer adhering to the second layer comprising an adduct of an excess of an aromatic polyamine and a polyepoxide.

17. A process for preparing a reinforced composite which comprises forming the desired reinforced product from the preimpregnated fibers defined in claim 13 and then applying heat so as to melt the inert barrier material and bring thermosetting resin and curing agent together effecting a cure of the resin to an insoluble infusible product.

18. A process as in claim 17 wherein the composite was heated at a temperature between 100° C. and 200° C.

19. A process for preparing a reinforced composite which comprises winding the preimpregnated fibers defined in claim 14 on a mandrel while under the desired tension and then heating the resulting composite to a temperature above 100° C. to melt the inert barrier material and effect a cure of the polyepoxide resin.

References Cited by the Examiner
UNITED STATES PATENTS

| | | | |
|---|---|---|---|
| 2,847,395 | 8/1958 | Wear | 161—185 |
| 2,939,805 | 7/1960 | Johnson | 117—75 |
| 3,098,054 | 7/1963 | Rosenberg | 260—837 X |
| 3,179,143 | 4/1965 | Schultz et al. | 156—310 X |

EARL M. BERGERT, *Primary Examiner.*

J. P. MELOCHE, *Assistant Examiner.*